United States Patent [19]

Sunter

[11] Patent Number: 4,500,326
[45] Date of Patent: Feb. 19, 1985

[54] METHOD FOR SEQUENTIALLY CLEANING FILTER ELEMENTS IN A MULTIPLE CHAMBER FABRIC FILTER

[75] Inventor: Thomas C. Sunter, Wellsville, N.Y.

[73] Assignee: The Air Preheater Company, Inc., Wellsville, N.Y.

[21] Appl. No.: 470,410

[22] Filed: Feb. 28, 1983

[51] Int. Cl.³ .............................................. B01D 46/04
[52] U.S. Cl. .......................................... 55/21; 55/96; 55/283; 55/287
[58] Field of Search .................... 55/21, 96, 273, 283, 55/286, 287, 288, 302, 304

[56] References Cited

U.S. PATENT DOCUMENTS

| | | | |
|---|---|---|---|
| 2,576,650 | 11/1951 | Wallin | 55/283 |
| 2,633,206 | 3/1953 | Bruckner | 55/283 |
| 3,073,097 | 1/1963 | Halleit et al. | 55/283 |
| 3,893,833 | 7/1975 | Ulvestad | 55/287 |
| 4,277,255 | 7/1981 | Apelgren | 55/96 |
| 4,384,874 | 5/1983 | Dattilo | 55/287 |

FOREIGN PATENT DOCUMENTS

| | | | |
|---|---|---|---|
| 2606146 | 8/1977 | Fed. Rep. of Germany | 55/96 |
| 89816 | 7/1981 | Japan | 55/283 |
| 899085 | 1/1982 | U.S.S.R. | 55/283 |

Primary Examiner—David L. Lacey
Attorney, Agent, or Firm—William W. Habelt

[57] ABSTRACT

An improved method of sequentially cleaning filter elements (14) housed in a plurality of filter chambers (12) collectively forming a fabric filter collection apparatus (10) wherein the cleaning operation is controlled in response to an upper limit of pressure differential across the dust collection apparatus. Whenever the pressure differential across the dust collection apparatus (10) reaches the upper limit value, one of the chambers (12) is isolated, the filter elements (14) housed therein are cleaned, and then the isolated chamber is returned to service. Each of the individual chambers (12) is isolated in sequence and the filter elements therein cleaned with the interval between consecutive isolations and cleanings being the time required for the pressure differential across the dust collection apparatus (10) to again reach the upper limit value of pressure differential.

5 Claims, 3 Drawing Figures

4,500,326

METHOD FOR SEQUENTIALLY CLEANING FILTER ELEMENTS IN A MULTIPLE CHAMBER FABRIC FILTER

BACKGROUND OF THE INVENTION

The present invention relates to the filtering of a gas stream for the removal of particulate matter entrained therein, and more particularly, to a method for cleaning the fabric filters housed in the various filter chambers of a multiple chamber fabric filter apparatus.

One highly successful technique for separating undesirable particulate matter from a gas stream laden with particulate matter is fabric filtration. Such filtration is typically carried out in a fabric filter apparatus, commonly referred to as a baghouse, which houses fabric filter means upon which at least a portion of the particulate matter in the gas stream traverses the filter means. Typically, the baghouse is comprised of a plurality of independent, isolatable filter chambers each of which houses a plurality of fabric filter bags suspended from a skeletal support system. The particulate matter-laden gas stream enters the baghouse from one end and, under the influence of a fan either disposed upstream or downstream of the baghouse, passes through the filter bags and out the opposite end of the baghouse, with the particulate matter being retained on the upstream side of the filter bags which the gas must traverse as it flows through the baghouse. The gas that is discharged from the baghouse is a relatively particulate matter-free gas stream and vented to the atmosphere.

Continuous operation of such a filter apparatus causes a cake of particulate matter to build up on the upstream surface of the filter bags or other fabric filter means. As this cake of dust builds up on the surface of the filter means, the pressure drop across the filter means increases whereupon it ultimately becomes necessary to effect removable of the filter cake so as not to exceed the pressure-volume capabilities of the flow of the inducing fan. Therefore, it has become customary to effect removal of the particulate matter cake building up on the filter means on a periodic basis when the pressure differential or drop across the baghouse has reached a preselected upper limit of desired operating-pressure differential. Typically, when the gas pressure drop between the inlet flange and the outlet flange of the collector has reached this upper limit, the cleaning is initiated by isolating one of the chambers of the collector and cleaning that chamber, then sequentially isolating and cleaning each of the remaining chambers until all chambers of the dust collector have been cleaned in fairly rapid succession. Alternately, the cleaning process may be terminated at a predesignated lower limit value on pressure drop across the dust collector even though all of the individual chambers may not have been cleaned in that particular cleaning sequence.

In either case, there is a significant change in pressure drop across the dust collector from the initiation of the cleaning process to termination of the cleaning process. The cleaning process is not reinitiated until the pressure drop across the dust collector has again reached the upper limit value. Therefore, in normal operation of the dust collector, the pressure differential across the dust collector will vary significantly from clean to dirty operation.

Although such a control system has proven satisfactory for processes where operational conditions, i.e. gas flow and dust concentration, are substantially constant, such a system is not well suited for use in operations where gas flow or dust concentration may vary significantly. For instance, when such a fabric filter dust collector is utilized to clean the flue gas from a furnace, the dust collector will see significantly varying gas flows and dust concentrations depending upon the nature of the fuel being burned and the load at which the furnace is operating at any given time. Under conditions of high gas flow or high dust concentrations, the filter cake will build up more rapidly on the bags causing the pressure differential across the dust collectors to increase rapidly. Conversely, under conditions of low gas flow or low dust concentration, the filter cake will build up more slowly and consequently the pressure differential across the dust collector will increase more slowly. Obviously, the more rapidly the pressure differential across the dust collector builds up, the more frequent the cleaning cycle must be initiated. Thus, in the type of system described above wherein there is a significant difference in pressure differential across the dust collector between the clean mode and the dirty mode, there will be a very erratic cleaning frequency profile depending upon the dust concentration and the gas flow history. An erratic cleaning frequency only complicates operation of the dust collector equipment and may lead to an imbalance in gas flow and dust load amongst the various chambers of the dust collector.

SUMMARY OF THE INVENTION

It is the object of the present invention to provide an improved control method and apparatus for utilizing any of the various conventional cleaning methods such as filter shaking, reverse gas flow cleaning, or pulsed gas flow cleaning.

It is a further object of the present to provide an improved control method and apparatus wherein continuous operation of the dust collector may be maintained with the pressure differential across the dust collector being maintained in a relatively narrow band of pressure differential consistent with maintaining a relatively constant cleaning frequency profile.

This and other objects of the present invention are achieved by controlling the cleaning in response to a upper limit of pressure differential across the dust collector with the cleaning of the individual compartments making up the dust collector being activated only when the pressure differential across the dust collector has reached this upper limit value. That is, whenever the pressure differential across the dust collector reaches the upper limit value, one of the chambers making up the dust collector is isolated and cleaned. The cleaned chamber is then returned to service and the dust collector operated with all chambers in service until the pressure differential across the dust collector again reaches the upper limit value. At that time, another of the inidividual chambers is isolated and cleaned. The second cleaned chamber is then returned to service and the dust collector again operated with all chambers in service until the upper limit value of pressure differential is again reached. At this time, another of the individual chambers is isolated and the cleaning process initiated.

In this manner, a continuous cleaning cycle is established wherein the interval between activations of the cleaning cycle is relatively constant and the variation in pressure differential between clean and dirty conditions is minimized. Each of the individual compartments is cleaned in sequence with the interval between cleanings being that time required for the pressure differential to rise from the clean system pressure differential to the dirty system pressure differential. The difference in pressure differential between clean and dirty conditions is relatively small because only one of the individual chambers making up the dust collector is cleaned during any one cleaning operation.

BRIEF DESCRIPTION OF THE DRAWINGS

The present invention is described in greater detail hereinafter, with reference to the accompanying drawing, wherein.

DESCRIPTION OF THE PREFERRED EMBODIMENT

Figure 1:
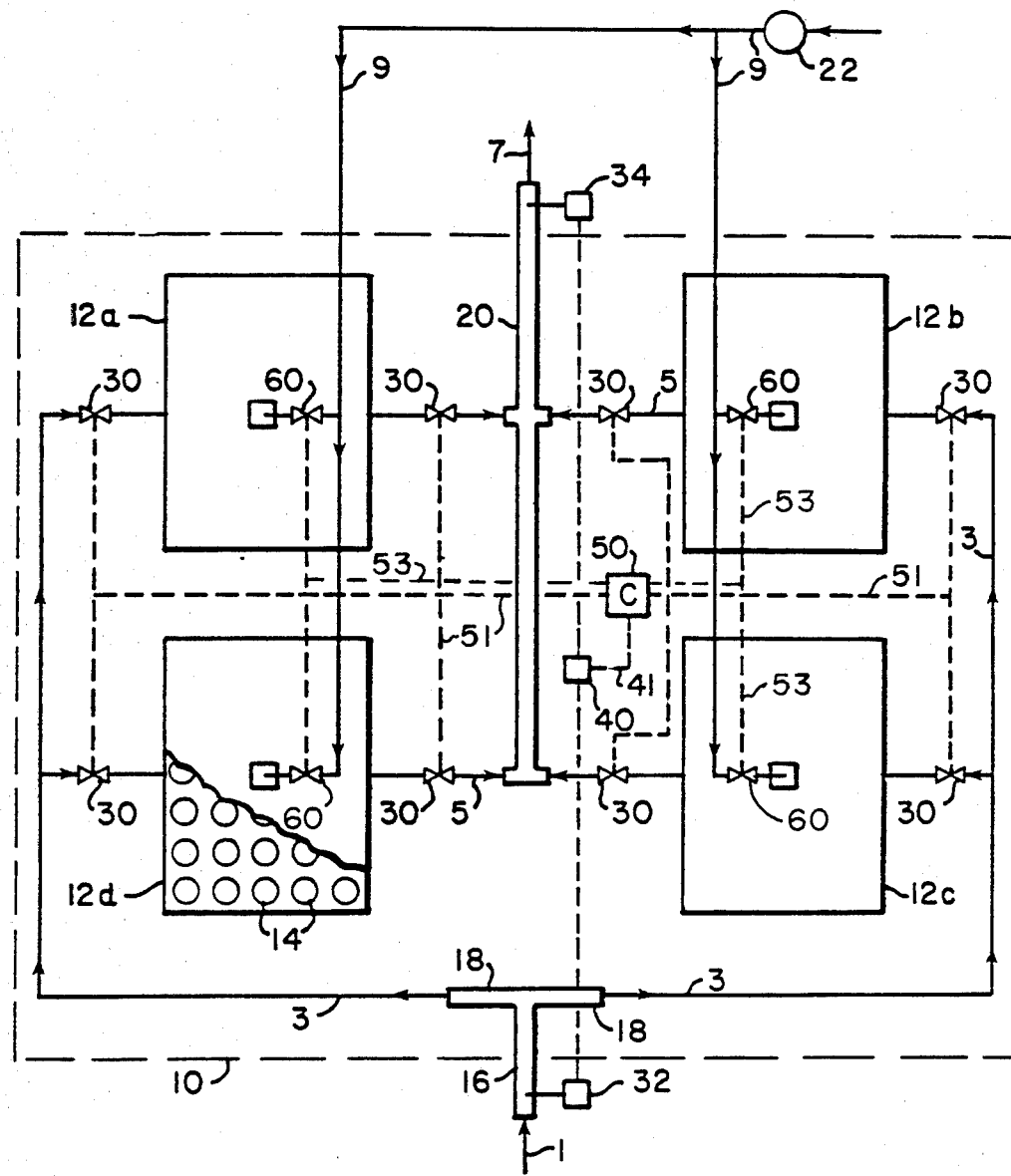
FIG. 1 is a schematic diagram illustrating the application of the control method and apparatus of the present invention to a multichamber fabric filter dust collector.

Referring now to the drawing, and particularly FIG. 1, there is depicted therein a fabric filter dust collector 10 housing a multiplicity of filter chambers 12a, 12b, 12c, 12d each of which houses a plurality of rows of filter bags 14. The dirty gas stream 1 to be cleaned is passed to the fabric filter dust collector 10 under the influence of an induced or forced draft fan (not shown) through gas inlet duct 16. The dirty gas stream 1 entering through the inlet duct 16 is split into a plurality of substreams 3 which pass through a multiplicity of gas supply ducts 18 to each of the individual filter chambers 12. Each of the dirty gas substreams 3 upon entering the individual filter chambers 12 traverse the fabric filter means 14 disposed therein and leave the individual fabric filter chambers 12 as clean gas substreams 5. The clean gas substreams 5 are then recombined to form a single clean gas stream 7 which passes from the filter housing 10 to the atmosphere through gas outlet duct 20.

As the dirty gas substreams 3 traverse the filter means 14 in each of the individual filter chambers 12, the gas penetrates through the filter means 14 while the dust entrained in the dirty gas substreams deposit on the upstream surface of the filter means 14 and are thereby removed from the gas stream and collected as a filter cake on the upstream surface of the filter means 14. As this filter cake builds up in thickness, the resistance to gas flow through the filter means increases. As a result of this increase and resistance to gas flow, the pressure drop across the dust collector 10, i.e., the difference in the pressure of the dirty gas stream 1 entering the dust collector and the pressure of the cleaning gas stream 7 leaving the dust collector, increases. Ultimately, the increase in the flow resistance causes the pressure drop to rise to such a level that it becomes necessary to clean the filter means 14 to remove the filter cake or at least a substantially portion thereof in order to continue operation of the dust collector 10.

In order to clean the filter means, i.e., to remove the filter cake deposited upon the upstream surface of the filter means, a flow of cleaning gas 9 is passed to the inidividual filter chambers 12 under the influence of fan 22 to flow in a reverse direction back through the filter means 14. As the cleaning gas flows in a reverse direction through the filter means 14 from the downstream side of the filter means 14 to the upstream side of the filter means 14, the filter cake becomes dislodged and drops in pieces to a hopper in the bottom of the filter chamber housing 12. Although a reverse gas flow type of cleaning system is illustrated in FIG. 1, it is to be understood that the present invention contemplates the use of other cleaning schemes such as physically shaking the filter means to loosen the filter cake or passing a pulse of pressurized cleaning gas through the filter means so as to vibrate the filter means and thereby dislodge the filter cake.

In the cleaning process, it is required that the normal flow of dirty gas be terminated in the filter chamber to be cleaned during the cleaning operation. However, it is also desirable to maintain the dust collector 10 in operation continuously. Therefore, a plurality of isolation valves or dampers 30 are provided in the gas supply ducts 18 and gas outlet ducts 20 immediately upstream and downstream of each of the individual filter chambers 12. This enables any one of the filter chambers 12 to be isolated by closing the isolation valves or dampers 30 associated therewith so that the dirty gas flow 1 is diverted and distributed amongst the remaining filter chambers 12 which remain in operation with their respective isolation valves or dampers 30 open.

According to the present invention, the cleaning process is controlled in response to the pressure drop across the duct collector 10. A first pressure-sensing means 32 is provided in the dirty gas inlet duct 16 at a location upstream of the subdivision of the particulate matter-laden gas stream 1 into a plurality of substreams 3. The pressure-sensing means 32 continuously senses the gas pressure at the inlet to the dust collector 10. A second pressure-sensing means 34 is provided in the clean gas outlet duct 20 at a location downstream of the recombination of the clean gas substreams 5 into the relatively particulate matter-free gas stream 7. The second pressure-sensing means 34 continuously senses the gas pressure at the outlet of the dust collector 10.

The pressures sensed by the first and second pressure sensing means 32 and 34 are continuously transmitted to a pressure comparison means 40 wherein the pressure drop, i.e. the pressure differential between the dirty gas stream 1 at the inlet to the dust collector 10 and the clean gas stream 7 at the outlet of the dust collector 10, is continuously measured and compared to a set point pressure drop. The set point pressure drop is preselected by the operator and corresponds to the upper limit of desired gas pressure differential.

Whenever the measured pressure drop across the dust collector 10 reaches the preselected upper limit of pressure drop, i.e the set point, an activation signal 41 is transmitted to a control means 50 for controlling the operation of the cleaning system. Upon receipt of the actuation signal 41 from the pressure comparison means 40, and in response thereto, the cleaning system control means 50 transmits a first control signal 51 to each of the isolation valves 30 associated with one of the individual filter chambers 12 to isolate that chamber from the flow of dirty gas thereto. Additionally, the cleaning system control means 50 transmits a second control signal 53 to a cleaning gas flow valve 60 operatively associated with the isolated filter chamber to open the valve 60 and initiate the flow of cleaning gases thereto.

After a predetermined period of time calculated to insure proper cleaning, the cleaning gas flow valve 60 is closed and isolation valves 30 are opened to return the previously isolated and now clean filter chamber to service. Thereafter, the flow of dirty gas is maintained to all of the individual filter chambers 12 without further cleaning of any of the filter means until the sensed gas pressure drop across the dust collector 10 again reaches the preselected upper limit of desired gas pressure differential. Thereupon, the cleaning process is again initiated but this time in a second of the individual filter chambers. The cleaning process will continue in this manner with the filter chambers 12 each being cleaned in turn in a rotating sequence with, in accordance with the present invention, the gas pressure drop being allowed to reach the upper limit of desired pressure drop during the interval of operation between each sequential cleaning.

Figure 2A:
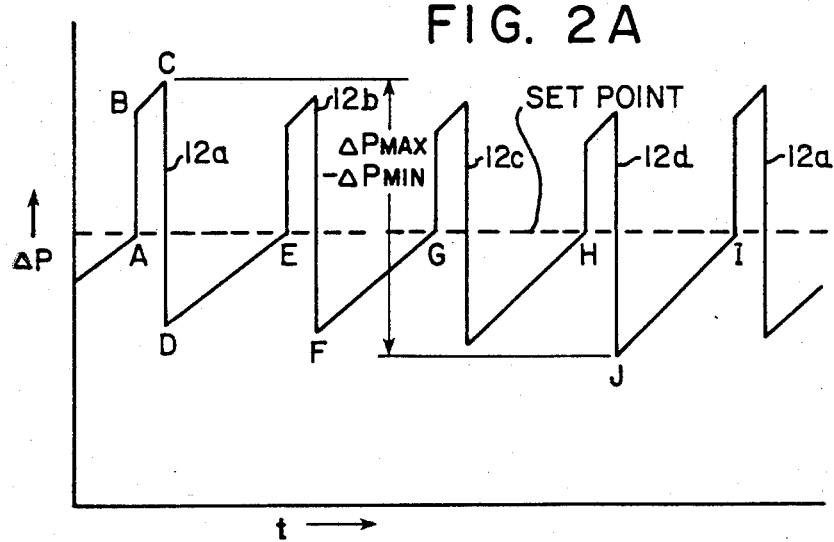
FIG. 2A is a graphical representation of the variation of pressure differential across the dust collector with time for the method of the present invention.
Figure 2B:
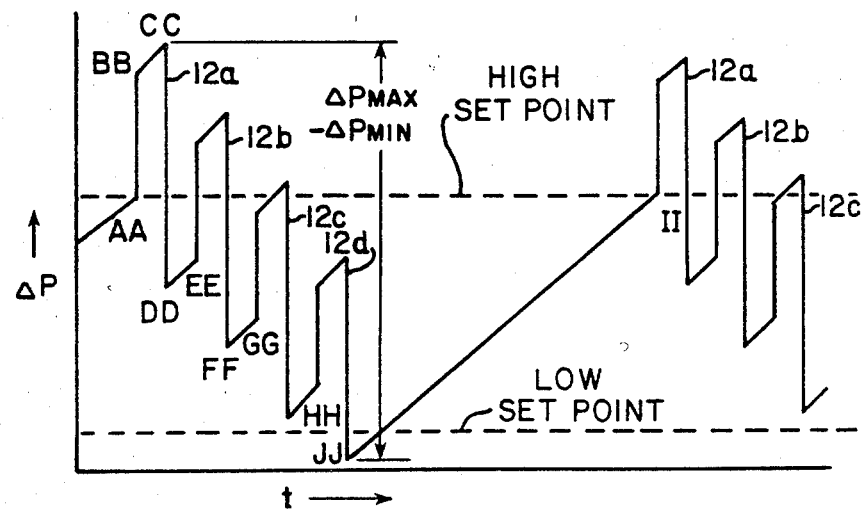
FIG. 2B is a graphical representation of the variation of differential pressure across the dust collector with time as typical in the prior art.

A better understanding of the present invention may be had by comparing the pressure drop profile history that would be experienced when operating a cleaning system in accordance with the present invention as illustrated in FIG. 2A to the pressure drop profile history illustrated in FIG. 2B which is representative of the pressure drop profile history experienced when operating a cleaning system in accordance with the prior art.

Referring now to FIG. 2A which is illustrative of the pressure drop profile history experienced when operating in accordance with the present invention, the cleaning operation would be initiated for the first time at point A when the pressure drop across the dust collector reaches the set point pressure drop value. Pressure comparison means 40 would then transmit an activation signal 41 to control means 50 for controlling the operation of the cleaning system. In response thereto, control means 50 would transmit a first control signal 51 to each of the isolation valves 30 associated with filter chamber 12a to isolate filter chamber 12a. Additionally, control means 50 would transmit a second signal 53 to the cleaning gas valve 60 associated with the isolated filter chamber 12a to open valve 60 and initiate the flow of cleaning gas therethrough. Upon the closing of the isolation valves 30 associated with the filter chamber 12a, the dirty gas flow would be diverted and redistributed amongst the remaining operating filter chambers 12b, 12c and 12d which would cause the pressure drop across the dust collector to rise to point B. The flow of cleaning gas through chamber 12a would be continued for a predetermined time period believed sufficient to insure proper cleaning of the filter means 14 housed within the chamber 12a. During this period, the pressure drop across the collector would rise to point C as dust continues to deposit on the filter means 14 housed in the remaining filter chambers 12b, 12c and 12d.

At the end of the predetermined cleaning time period, control means 50 would transmit a control signal to close the clean gas valve 60 associated with the isolated filter chamber 12a and open the isolation valves 30 associated therewith to reestablish the flow of dirty gas therethrough. When the now clean filter chamber 12a is brought back in service, the pressure drop across the dust collector will drop to point D. The filter chamber 12a now being in a clean condition rather than in the dirty condition it was in prior to cleaning, the pressure drop across the dust collector 10 would have dropped from the set point value at point A to a level somewhat below the set point at a point D.

In accordance with the present invention, all filter chambers now remain in operation until the pressure drop across the dust collector has again risen to the set point level at point E. At this point, pressure sensing means 40 would again send a control signal 41 to the cleaning system control means 50 to again activate the cleaning system. This time, however, control means 50 would send a first control signal 51 to each of the isolation valves 30 associated with the filter chamber 12b to isolate the filter chamber 12b. Additionally, the cleaning system control means 50 would transmit a second signal 53 to the cleaning gas flow valve 60 operatively associated with the isolated filter chamber 12b to open the valves 60 and initiate the flow of cleaning gas therethrough. Again the cleaning gas would be allowed to flow the isolated filter chamber 12b for a predetermined period of time calculated to insure proper cleaning.

At the end of that period of time, control means 50 would send a control signal to close the cleaning gas valve 60 and open the isolation valves 30 to reestablish the flow of dirty gas to a now clean filter chamber 12b. When the now clean filter chamber 12b is returned to service, the system pressure drop would again have decreased to a value somewhat lower than the set point value at point F. All filter chambers would again remain in service until the pressure drop across the dust collector 10 has again reached the preselected upper limit of desired pressure drop, i.e. the set point, at point G.

At this time, the same cleaning process would occur but it would now be filter chamber 12c which would be isolated and cleaned for a predetermined period of time. After bringing the clean filter chamber 12c back into service, all filter chambers would again remain in service until the pressure drop across the dust collector has again reached the set point at point H whereupon the cleaning of filter chamber 12d would now be initiated. When the clean filter chamber 12d is brought back into service, all filter chambers would again remain in service until the pressure drop across the dust collector has again reached the set point pressure drop at point I whereupon filter chamber 12a would now be isolated for a second time and cleaned.

This rotating sequence of cleaning would be continued so long as the dust collector 10 is in operation with each filter chamber being cleaned in turn in the rotating sequence with the gas pressure drop being allowed to return to the upper limit of desired pressure drop during the interval between each sequential cleaning operation.

The pressure drop profile history of a typical prior art cleaning system would be very much different as illustrated in FIG. 2B. In a typical prior art cleaning system, the cleaning operation will be initiated at point AA when the pressure drop across the dust collector has first reached the high set point pressure value. At this point, filter chamber 12a would be isolated and the flow of cleaning gas be established to the isolated filter chamber 12a for a preselected period of time. At the end of that preselected period of time, the filter chamber 12a would again be placed in service. Upon the isolation of the filter chamber 12a, the pressure drop across the dust collector would increase from point AA to point BB and further increase to point CC during the period in which the filter chamber 12a remains isolated for the cleaning operation. Upon the return of the clean filter chamber 12a to service, the pressure drop would have decreased to point DD, a value somewhat below the high set point and corresponding to the point D in FIG. 2A.

After the filter chamber 12a has been brought back into service, in the prior art the next step would be to isolate filter chamber 12b and initiate the filter cleaning of filter chamber 12b. No opportunity would be given for the pressure drop across the dust collector to return to the high set point level. Rather in the brief interval that it takes to return filter chamber 12a to service and then isolate filter chamber 12b, the pressure drop would only have risen from point DD to point EE. After the filter chamber 12b has been isolated, cleaned and then returned to service, the pressure drop across the dust collector will decrease to point FF, a value significantly lower than the high set point.

The prior art cleaning sequence would continue with as many filter chambers as necessary to bring the pressure drop to a value below a preselected low set point being isolated and cleaned. When the last isolated filter chamber, in this example filter chamber 12d, is returned to service, the pressure drop across the dust collector 10 will have decreased to point JJ below the low set point value, which is substantially lower than the high set point value and very much lower than the pressure drop at point J of FIG. 2A which represents the differential pressure across the dust collector at the end of one cleaning rotation utilizing the control process of the present invention. Once the pressure differential has dropped due to cleaning to a value below the low set point, the differential pressure across the dust collector would be permitted to rise again to the set point value at point II before a second cleaning sequence is initiated.

As can be seen from FIGS. 2A and 2B, the difference between the maximum pressure drop experienced when one of the filter chambers is isolated for cleaning and the pressure drop after one complete cleaning sequence, i.e. the difference in pressure drop from point C to point J and point CC to point JJ, is significantly smaller with the cleaning process of the present invention than with the cleaning process of the prior art. Thus, the cleaning operation occurs over a fairly narrow band of pressure drop across the dust collector. This provides for a better balance of gas flow amongst the filter chambers and therefore tends to lessen the possibility of overloading of any one chamber while other chambers are being cleaned in the cleaning sequence. A further advantage of the cleaning process of the present invention is that the cleaning frequency is automatically adjusted for changes in the gas flow rate or the dust concentration in the gas since the pressure drop across the dust collector is always allowed to return to the set point value prior to initiating the cleaning of the next filter chamber. This permits the operator to adjust the set point to changes in gas flow rate or dust concentration thereby giving the operator much greater flexibility in controlling the operation of the dust collector.

In the preferred embodiment of the present process, the set point pressure drop, i.e. the preselected upper limit of desired gas pressure differential across the dust collector 10, is varied, either automatically or manually by the operator, in response to changes in the volume flow rate of the parrticulate matter-laden gas stream to the dust collector 10. Additionally, the set point value of pressure drop may be varied, again either automatically or manually, by the operator in response to the particulate matter concentration in the particulate matter-laden gas stream entering the dust collector 10. Further, the set point pressure drop may be varied in response to a combination of the volume flow rate and the dust concentration of the particulate matter-laden gas stream 1 entering the dust collector 10.

Although described and illustrated herein in relation to a cleaning system employing reversed gas flow as the means for cleaning the filter means housed in the filter chambers, the cleaning process of the present invention contemplates the use of any other conventional cleaning means adaptable for use and combination with the cleaning process of the present invention such as means for physically shaking the filter means to dislodge the filter cake therefrom and means for introducing pulses of high pressure cleaning gas to vibrate the filter cake from the filter means.

I claim:

1. In a method of filtering particulate matter from a particulate matter-laden gas stream wherein the particulate matter-laden gas stream is passed through a fabric filter collection apparatus comprised of a plurality of independent, isolatable filter chambers, each filter chamber housing fabric filter means upon which a portion of the particulate matter deposits, the particulate matter-laden gas stream being subdivided upstream of the collection apparatus into a like plurality of substreams each of which is passed through one of said plurality of independent, isolatable filter chambers prior to recombining said substreams downstream of said collection apparatus to form a relatively particulate matter-free gas stream, an improved method of sequentially cleaning the fabric filter means housed in each of said plurality of filter chambers of deposited particulate matter comprising:
   a. continuously sensing the gas pressure differential between a point upstream of the subdivision of the particulate matter-laden gas stream into a plurality of substreams and a point downstream of the recombination of said substream into the relatively particulate matter-free gas stream;
   b. continuously comparing the sensed gas pressure differential to a preselected upper limit of desired gas pressure differential;
   c. when the sensed gas pressure differential reaches the preselected upper limit of desired gas pressure differential, isolating one of said plurality of filter chambers and cleaning the deposited particulate matter from the fabric filter means disposed within said isolated filter chamber;
   d. returning said isolated filter chamber to operation after completion of the cleaning and thereafter maintaining all of said plurality of filter chambers in normal filtering operation without further cleaning of the fabric filter means disposed in any of said plurality of filter chambers until the sensed gas pressure differential again reaches the preselected upper limit of desired gas pressure differential;
   e. while continuously performing steps (a) and (b), continuously repeating steps (c) and (d) so as to clean the fabric filter means disposed within each of the remaining uncleaned chambers of said plurality of filter chambers in a rotating sequence thereby cleaning all of said plurality of filter chambers prior to recleaning any one thereof; and
   f. varying the preselected upper limit of desired gas pressure differential in response to the concentration of particulate matter in the particulate matter-laden gas stream.

2. A method as recited in claim 1 wherein step (c) comprises:
   a. when the sensed gas pressure differential reaches the preselected upper limit of desired gas pressure differential, isolating one of said plurality of filter chambers from gas flow and diverting the substream flowing thereto amongst the remaining filter chambers of said plurality of filter chambers;
b. then removing the particulate matter deposited upon the fabric filter means disposed within said isolated filter chamber; and
c. then returning said cleaned filter chamber to service by reestablishing gas flow therethrough.

3. A method as recited in claim 2 wherein the step of removing the particulate matter deposited upon the fabric filter means comprises shaking the fabric filter means so as to cause the particulate matter collecting thereupon to dislodge.

4. A method as recited in claim 2 wherein the step of removing the particulate matter deposited upon the fabric filter means comprises passing a flow of cleaning gas through the filter means in a direction opposite to the direction of the flow of the particulate matter-laden gas therethrough thereby causing the particulate matter depositing thereupon to dislodge.

5. A method as recited in claim 2 further comprising varying the preselected upper limit of desired gas pressure differential in response to the volume flow rate of the particulate matter-laden gas stream.

* * * * *